(12) United States Patent
Dettinger et al.

(10) Patent No.: US 7,574,423 B2
(45) Date of Patent: Aug. 11, 2009

(54) PARTIAL DATA MODEL EXPOSURE THROUGH CLIENT SIDE CACHING

(75) Inventors: Richard D. Dettinger, Rochester, MN (US); Frederick A. Kulack, Rochester, MN (US); Richard J. Stevens, Mantorville, MN (US); Eric W. Will, Oronoco, MN (US)

(73) Assignee: International Business Machines Corporation, Armonk, NY (US)

( * ) Notice: Subject to any disclaimer, the term of this patent is extended or adjusted under 35 U.S.C. 154(b) by 782 days.

(21) Appl. No.: 10/392,642

(22) Filed: Mar. 20, 2003

(65) Prior Publication Data

US 2004/0186840 A1 Sep. 23, 2004

(51) Int. Cl.
*G06F 17/30* (2006.01)

(52) U.S. Cl. .............................. 707/3; 707/100; 707/4; 707/5

(58) Field of Classification Search ................ 707/4, 707/5, 100, 104.1, 200, 202, 204, 7, 6, 206, 707/3, 10, 2
See application file for complete search history.

(56) References Cited

U.S. PATENT DOCUMENTS

| | | | | |
|---|---|---|---|---|
| 5,452,447 A | * | 9/1995 | Nelson et al. | 707/205 |
| 5,628,005 A | * | 5/1997 | Hurvig | 707/8 |
| 5,734,887 A | * | 3/1998 | Kingberg et al. | 707/4 |
| 5,737,536 A | * | 4/1998 | Herrmann et al. | 709/229 |
| 5,794,229 A | * | 8/1998 | French et al. | 707/2 |
| 5,903,887 A | * | 5/1999 | Kleewein et al. | 707/2 |
| 6,014,667 A | * | 1/2000 | Jenkins et al. | 707/10 |
| 6,014,671 A | * | 1/2000 | Castelli et al. | 707/101 |
| 6,119,126 A | * | 9/2000 | Yee et al. | 707/3 |
| 6,275,819 B1 | * | 8/2001 | Carter | 707/2 |
| 6,327,643 B1 | * | 12/2001 | Egan | 711/134 |
| 6,341,281 B1 | * | 1/2002 | MacNicol et al. | 707/3 |
| 6,356,913 B1 | * | 3/2002 | Chu et al. | 707/103 R |
| 6,401,090 B1 | * | 6/2002 | Bailis et al. | 707/9 |
| 6,615,253 B1 | * | 9/2003 | Bowman-Amuah | 709/219 |
| 6,629,132 B1 | * | 9/2003 | Ganguly et al. | 709/213 |
| 6,725,227 B1 | | 4/2004 | Li | |
| 6,754,696 B1 | * | 6/2004 | Kamath et al. | 709/213 |
| 6,895,472 B2 | * | 5/2005 | Neiman et al. | 711/118 |
| 6,925,470 B1 | * | 8/2005 | Sangudi et al. | 707/102 |

(Continued)

OTHER PUBLICATIONS

Dettinger et al., IBM U.S. Appl. No. 10/083,075, filed Feb. 26, 2002, "Improved Application Portability and Extensibility Through Database Schema and Query Abstraction".

*Primary Examiner*—Hosain T Alam
*Assistant Examiner*—Leon Harper
(74) *Attorney, Agent, or Firm*—Patterson & Sheridan, LLP

(57) ABSTRACT

The present invention generally provides methods, articles of manufacture and systems for exposing, on a client device, fields of a data model representing an underlying database for use in building queries against the database. For some embodiments, the client device may be a device having limited resources, such as a handheld computing device. Therefore, rather than load and expose the entire data model on the client at once, a limited portion of the data model may be exposed on a client in a "just in time" (JIT) basis. The limited portion may be determined, for example, based on input received from a user and system parameters, such as the system memory and network bandwidth available to the client device.

13 Claims, 13 Drawing Sheets

U.S. PATENT DOCUMENTS

| | | | |
|---|---|---|---|
| 6,973,457 B1 * | 12/2005 | Bastawala et al. | 707/10 |
| 7,013,284 B2 * | 3/2006 | Guyan et al. | 705/9 |
| 7,035,846 B2 * | 4/2006 | Gupta et al. | 707/3 |
| 7,054,917 B1 * | 5/2006 | Kirsch et al. | 709/217 |
| 7,058,958 B1 * | 6/2006 | Shutt et al. | 719/328 |
| 7,188,145 B2 * | 3/2007 | Lowery et al. | 709/214 |
| 7,260,576 B2 * | 8/2007 | Pasupathy et al. | 707/10 |
| 7,464,069 B2 * | 12/2008 | Chen et al. | 707/2 |
| 2002/0026507 A1 * | 2/2002 | Sears et al. | 709/224 |
| 2002/0107935 A1 * | 8/2002 | Lowery et al. | 709/216 |
| 2002/0165942 A1 * | 11/2002 | Ulrich et al. | 709/219 |
| 2003/0004933 A1 * | 1/2003 | Ben-Yehezkel | 707/3 |
| 2003/0009357 A1 * | 1/2003 | Pish | 705/4 |
| 2003/0028695 A1 * | 2/2003 | Burns et al. | 710/200 |
| 2003/0065826 A1 * | 4/2003 | Skufca et al. | 709/315 |
| 2003/0163550 A1 * | 8/2003 | Ramanathan et al. | 709/219 |
| 2004/0054777 A1 * | 3/2004 | Ackaouy et al. | 709/225 |
| 2004/0059719 A1 * | 3/2004 | Gupta et al. | 707/3 |
| 2004/0088288 A1 * | 5/2004 | Pasupathy et al. | 707/3 |
| 2004/0103199 A1 * | 5/2004 | Chao et al. | 709/228 |

* cited by examiner

SEARCH MAIN
USER : RESEARCHER 1
SEARCH : 40 YEAR OLDS WITH HEART DISEASE

SEARCH CONDITIONS

| ACTION | NOT | CONDITION |
|--------|-----|-----------|
| DELETE | ☐ | (AGE > 40) |
| DELETE AND | ☐ | DIAGNOSIS = HEART DISEASE |

[ADD CONDITION] — 504

OUTPUT

[ADD RESULTS] — 512

SEARCH

[RUN]   [SAVE]

[SHOW SQL]                    [CANCEL]

ADD SEARCH CONDITION
USER : RESEARCHER 1
SEARCH : UNSAVED

CHOOSE ONE CONDITION CATEGORY AND CLICK NEXT.

○ DIAGNOSTIC

⊙ DEMOGRAPHIC

[NEXT] — 540   [CANCEL] — 542

*FIG. 4B*

ADD SEARCH CONDITION

USER : RESEARCHER 1　　　　　　CATEGORY=DEMOGRAPHICS
SEARCH : UNSAVED

CHOOSE ONE CONDITION SUBCATEGORY AND CLICK NEXT.

○　ADDRESS/GEOGRAPHY/LOCATION

○　RACE/GENDER

⦿　BIRTH AND AGE RELATED

[NEXT] ─ 540　　[CANCEL] ─ 524

ADD SEARCH CONDITION

USER : RESEARCHER 1　　　　CATEGORY=DEMOGRAPHICS
SEARCH : UNSAVED　　　　　　SUBCATEGORY=BIRTH AND AGE RELATED

CHOOSE ON FIELD AND ENTER A VALUE/RANGE OF VALUES AND CLICK ADD CONDITION OR CANCEL

○　AGE IN YEARS　　[ > ▽ ]　[ 32 ▽ ]

○　AGE IN DECADES　[ < ▽ ]　[ 30's ▽ ]

○　BIRTHDATE　　　[ = ▽ ]　[ 01/01/1970 ]　TO　[ 01/01/1971 ]

[ADD CONDITION TO QUERY] ─ 544　　　　[CANCEL] ─ 524

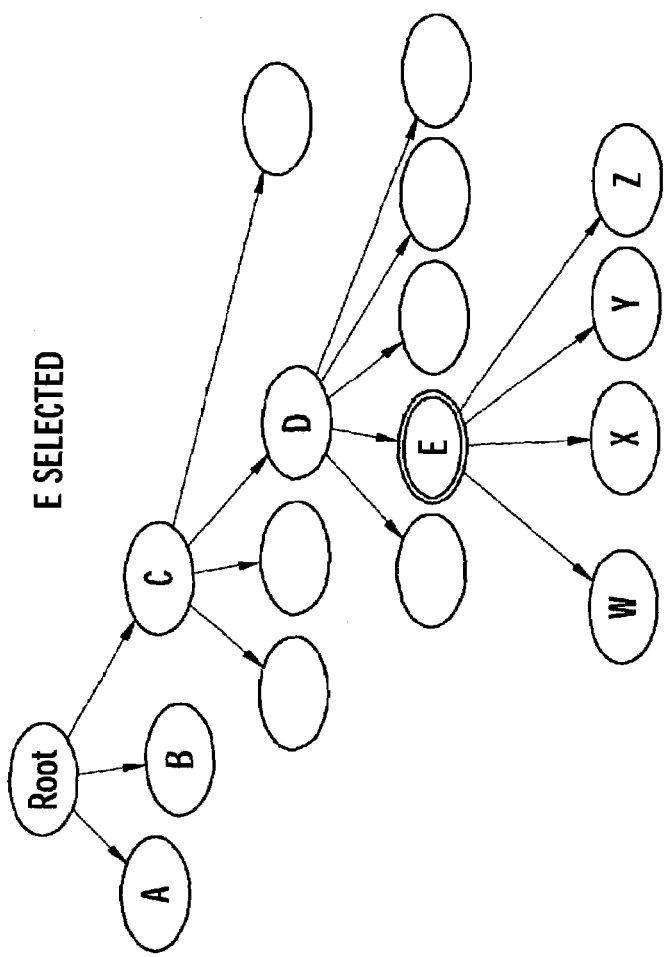
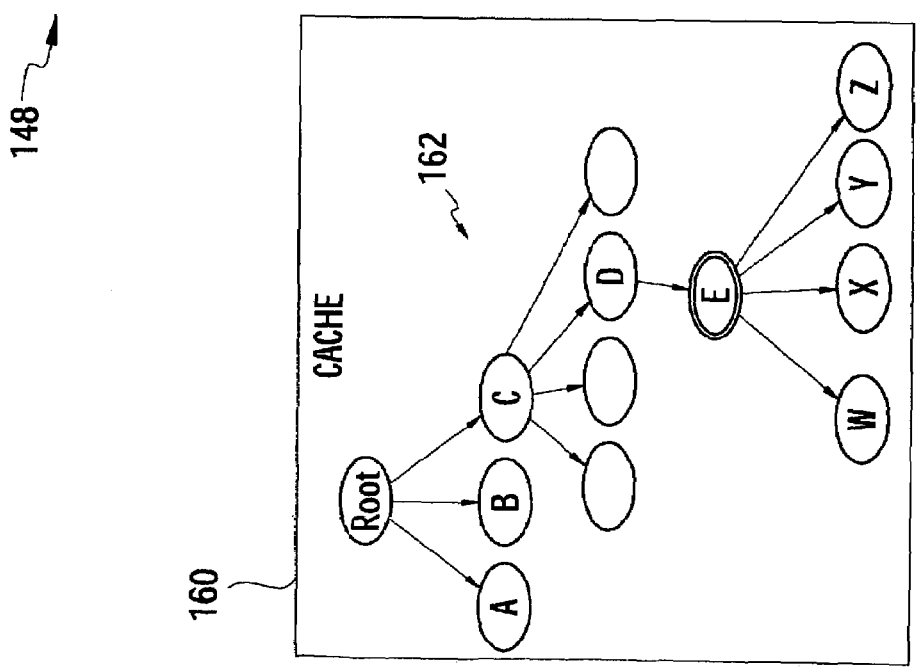
FIG. 5D

PARTIAL DATA MODEL EXPOSURE THROUGH CLIENT SIDE CACHING

CROSS-REFERENCE TO RELATED APPLICATIONS

The present invention is related to the commonly owned, co-pending application 10/083,075, entitled "Improved Application Portability And Extensibility Through Database Schema And Query Abstraction," filed Feb. 26, 2002.

BACKGROUND OF THE INVENTION

1. Field of the Invention

The present invention generally relates to data processing and more particularly to allowing a client having limited system resources to access a relatively large data model, residing on a server, as if the data model was resident on the client.

2. Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses.

Regardless of the particular architecture, in a DBMS, a requesting entity (e.g., an application or the operating system) demands access to a specified database by issuing a database access request. Such requests may include, for instance, simple catalog lookup requests or transactions and combinations of transactions that operate to read, change and add specified records in the database. These requests are made using high-level query languages such as the Structured Query Language (SQL). Illustratively, SQL is used to make interactive queries for getting information from and updating a database such as International Business Machines' (IBM) DB2, Microsoft's SQL Server, and database products from Oracle, Sybase, and Computer Associates. The term "query" denominates a set of commands for retrieving data from a stored database. Queries take the form of a command language that lets programmers and programs select, insert, update, find out the location of data, and so forth.

Queries are constructed of query conditions that serve to filter results returned from the query. Accordingly, a query may be thought of as group of filters put together to sift out only the data in which they are interested. Query conditions are typically constructed by specifying conditional operations on one or more fields in the targeted database. To facilitate query building, some client applications may include a graphical user interface (GUI) that exposes these fields to a user in an organized manner (e.g., as a hierarchical data model with categories and subcategories of fields). A typical query building session may involve loading the data model from the server and exposing portions of the data model as the user navigates the hierarchical data model, via the GUI, to select fields to involve in a query.

As the relative size and complexity of the underlying database increases, the size of the data model and number of fields to expose to the user via the GUI will grow accordingly. Conventional client systems (e.g., desktop or laptop computers connected to the database server via a network) used to run the GUI typically have sufficient system memory to allow the larger data model to be loaded on the client. However, it may also be desirable to run the GUI on non-conventional client systems having limited system memory, such as handheld computing devices (e.g., personal digital assistants and the like). These devices may have insufficient system memory to allow the entire data model to be loaded. Further, these devices may also rely on wireless data connections to a network, which may have lower bandwidth than conventional "wired" network connections. Therefore, even if a device has sufficient memory, network latency may prevent the entire data model from being loaded on the device in an acceptable amount of time.

Accordingly, there is a need for an improved method for exposing, on a client device having limited resources, fields of a data model representing an underlying database.

SUMMARY OF THE INVENTION

The present invention generally provides methods, articles of manufacture and systems for exposing, on a client device having limited resources, fields of a data model representing an underlying database for use in building queries against the database.

For some embodiments, a method for use by a client in building queries against a database represented by a data model generally includes receiving a request from a user to display one or more entities of the data model, retrieving, in response to the request, a portion of the data model related to the one or more entities, storing the retrieved portion of the data model in a cache, and displaying the one or more entities to the user.

For some embodiments, a method for accessing a hierarchical tree structure of nodes generally includes receiving a request from a user to access one or more entities associated with a first node, in response to the request, retrieving a portion of the tree structure related to the first node, storing the retrieved portion of the tree structure in a cache, and presenting, to the user, the one or more entities associated with the first node.

For some embodiments, the article of manufacture generally includes a computer-readable medium containing a program which, when executed by a processor, performs operations for building queries against a database represented by a data model. The operations generally include providing a user with an interface for building a query against the database, receiving, via the interface, a request from a user to display one or more entities of the data model, retrieving, in response to the request, a portion of the data model related to the one or more entities, storing the retrieved portion of the data model in a cache, and displaying the one or more entities to the user.

For some embodiments, the system generally includes a database, a data abstraction model comprising logical fields representative of physical fields of the database, and a client device. The client device generally includes a cache and an executable component configured to maintain a limited portion of the data abstraction model in the cache, the limited portion comprising one or more logical fields determined by input from a user, and expose, to the user, for use in building queries, one or more of the logical fields maintained in the cache.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIGS. 4A-4D are exemplary graphical user interface (GUI) screens for building a database query in accordance with the present invention.

FIGS. 5A-5D illustrate an exemplary tree structure of a data model and a client cache containing portions thereof, in accordance with the present invention.

DETAILED DESCRIPTION OF THE PREFERRED EMBODIMENTS

Figure 1:
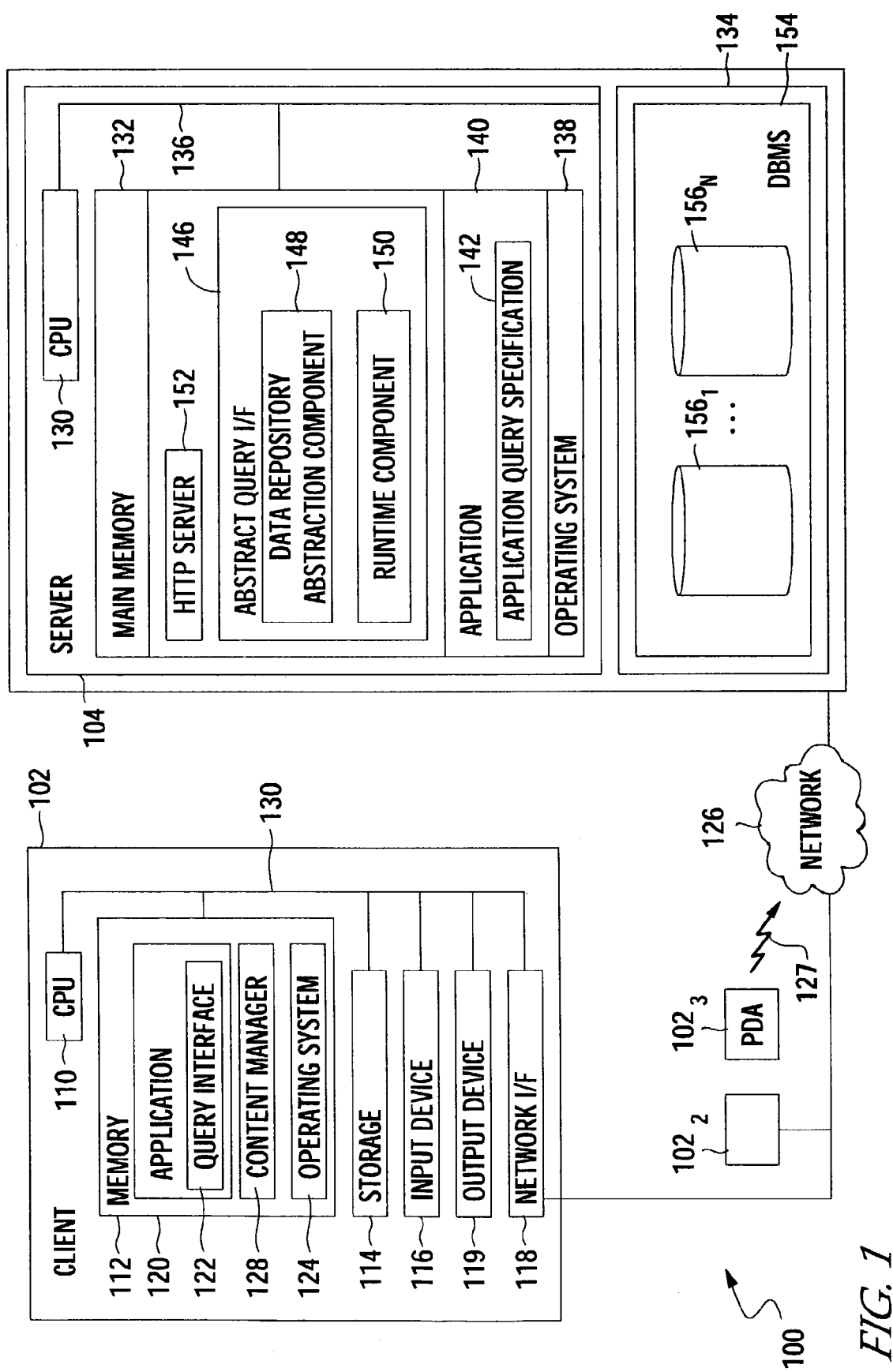
FIG. 1 is a computer system illustratively utilized in accordance with the present invention.

The present invention generally provides methods, articles of manufacture and systems for exposing, on a client device, fields of a data model representing an underlying database for use in building queries against the database. For some embodiments, the client device may be a device having limited resources, such as a handheld computing device. Therefore, rather than load and expose the entire data model on the client at once, a limited portion of the data model may be exposed on a client in a "just in time" (JIT) basis. For example, the particular portion exposed may depend on a user's input (e.g., a navigation request), while the size of the exposed portion may depend on system parameters, such as the system memory and network bandwidth available to the client.

In other words, embodiments of the present invention may provide a mechanism to intelligently cache portions of the data model on the client device, allowing a user to navigate through the complete data model as if it was loaded on the device, although the device may have insufficient resources to actually hold the completed data model. By not loading portions of the data model on the client device until requested by a user, client resources, such as system memory and network bandwidth may be conserved.

According to some embodiments, the data model may be a hierarchical structure of nodes, each node representing a field or category of fields. As used herein, the term node generally refers to any point in a hierarchical tree structure, including parent nodes and leaf nodes. As used herein, the term parent node generally refers to a point in a tree structure at which subordinate items (or children nodes) originate, while the term leaf node (or childless node) generally refers to an end point in the tree structure. Accordingly, leaf nodes in the structure may represent actual fields of the database, while parent nodes may represent categories of fields. Nodes that are both parent nodes and children of another node or nodes themselves may represent subcategories of fields.

As an illustration, a data model representing a database used in a medical research facility, may be organized as a tree structure including separate category nodes for demographic patient information, patient diagnoses, and test results. Each of these category nodes may have, as children, subcategory nodes. For example, the demographic category node may have, as children, subcategory nodes for name, address, and age related subcategories. The age related subcategory may have as children leaf nodes for a birth date, age in years, age in decades, etc. While embodiments of the present invention may be applied in a wide variety of environments, to facilitate understanding, the description below may refer to a medical research environment as a specific, but not limiting example of a suitable environment. Of course, the number of levels in the tree structure (e.g., the number of categories and subcategories) may depend on a particular database modeled.

In one embodiment of the present invention, the data model is implemented as a data repository abstraction (DRA) component containing a collection of abstract representations of physical fields of the database. Thus, this data abstraction model provides a logical view of the underlying database, allowing the user to generate "abstract" queries against the data warehouse without requiring direct knowledge of its underlying physical properties. A runtime component (e.g., a query execution component) performs translation of abstract queries (generated based on the data abstraction model) into a form that can be used against a particular physical data representation.

The concepts of data abstraction and abstract queries are described in detail in the commonly owned, co-pending application 10/083,075, entitled "Improved Application Portability And Extensibility Through Database Schema And Query Abstraction," filed Feb. 26, 2002, herein incorporated by reference in its entirety. While the data abstraction model described herein provides one or more embodiments of the invention, persons skilled in the art will recognize that the concepts provided herein can be implemented without such a data abstraction model while still providing the same or similar results.

Exemplary Application Environment

FIG. 1 shows an exemplary networked computer system 100, in which embodiments of the present invention may be utilized. For example, embodiments of the present invention may be implemented as a program product for use with the system 100, to expose portions of a data repository abstraction component 148 (used to represent fields in one or more databases $156_{1 \ldots N}$, organized as a database management system 145) on one or more clients 102 (illustratively, three clients, $102_1$, $102_2$, and $102_3$ are shown).

The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

As illustrated in FIG. 1, the system 100 generally includes the clients 102 and at least one server 104, connected via a network 126. In general, the network 126 may be a local area network (LAN) and/or a wide area network (WAN). In a particular embodiment, the network 126 is the Internet. As illustrated, one or more of the clients 102, may be a handheld device, such as a personal digital assistant (PDA) $102_3$, and may have a wireless connection 127 to the network 126.

As illustrated by the client $102_1$, the client computers 102 generally include a Central Processing Unit (CPU) 110 connected via a bus 130 to a memory 112, storage 114, an input device 116, an output device 119, and a network interface device 118. The input device 116 can be any device to give input to the client computer 102. For example, a keyboard, keypad, light-pen, touch-screen, track-ball, or speech recognition unit, audio/video player, and the like could be used. The output device 119 can be any device to give output to the user, e.g., any conventional display screen. Although shown separately from the input device 116, the output device 119 and input device 116 could be combined. For example, the PDA $102_3$ may include a display screen with an integrated touch-screen or a display with an integrated keyboard.

The network interface device 118 may be any entry/exit device configured to allow network communications between the client 102, and the server 104 via the network 126. For example, the network interface device 118 may be a network adapter or other network interface card (NIC). For a handheld device, such as PDA $102_3$, the network interface device 118 may comprise any suitable wireless interface to provide the wireless connection 127 to the network 126.

Storage 114 is preferably a Direct Access Storage Device (DASD). Although it is shown as a single unit, it could be a combination of fixed and/or removable storage devices, such as fixed disc drives, floppy disc drives, tape drives, removable memory cards, or optical storage. The memory 112 and storage 114 could be part of one virtual address space spanning multiple primary and secondary storage devices.

The memory 112 is preferably a random access memory (RAM) sufficiently large to hold the necessary programming and data structures of the invention. While the memory 112 is shown as a single entity, it should be understood that the memory 112 may in fact comprise a plurality of modules, and that the memory 112 may exist at multiple levels, from high speed registers and caches to lower speed but larger DRAM chips.

Illustratively, the memory 112 contains an operating system 124. Illustrative operating systems, which may be used to advantage, include Linux and Microsoft's Windows®, as well as any operating systems designed for handheld devices, such as the PDA $102_3$ (e.g., Palm OS®, Windows® CE, and the like). More generally, any operating system supporting the functions disclosed herein may be used.

The memory 112 is also shown containing a query interface 122, such as a browser program, that, when executed on CPU 110, provides support for building queries based on the data repository abstraction component 148. In one embodiment, the query interface 122 includes a web-based Graphical User Interface (GUI), which allows the user to display Hyper Text Markup Language (HTML) information. More generally, however, the query interface 122 may be any program (preferably GUI-based) capable of exposing a portion of the DRA component 148 on the client 102 for use in building queries. As will be described in greater detail below, queries built using the query interface 122 may be sent to the server 104 via the network 126 to be issued against one or more databases 156.

The server 104 may be physically arranged in a manner similar to the client computer 102. Accordingly, the server 104 is shown generally comprising a CPU 130, a memory 132, and a storage device 134, coupled to one another by a bus 136. Memory 132 may be a random access memory sufficiently large to hold the necessary programming and data structures that are located on the server 104.

The server 104 is generally under the control of an operating system 138 shown residing in memory 132. Examples of the operating system 138 include IBM OS/400®, UNIX, Microsoft Windows®, and the like. More generally, any operating system capable of supporting the functions described herein may be used.

In one embodiment, elements of a query are specified by a user through the query interface 122 which may be implemented as a set of GUI screens. The content of the GUI screens may be generated by the application(s) 140. In a particular embodiment, the GUI content is hypertext markup language (HTML) content which may be rendered on the client computer systems 102 with the browser program 122. Accordingly, the memory 132 may include a Hypertext Transfer Protocol (http) server process 138 (e.g., a web server) adapted to service requests from the client computer 102. For example, the server process 152 may respond to requests to access the database(s) 156, which illustratively resides on the server 104. Incoming client requests for data from a database 156 invoke an application 140 which, when executed by the processor 130, perform operations necessary to access the database(s) 156. In one embodiment, the application 140 comprises a plurality of servlets configured to build GUI elements, which are then rendered by the query interface 122.

Referring back to the client $102_1$, the memory 112 may also include a content manager 128 generally configured to control portions of the DRA component 148 exposed on the client 102. For example, the content manager 128 may retrieve portions of the DRA component 148, from the server 104, based on user input (e.g., navigation requests received via the query interface 122). As will be described in greater detail below, for some embodiments, the content manager 128 may be designed to optimize the portions of the DRA component loaded on the client 102, in an effort to minimize the frequency with which new portions are retrieved from the server 104, for example, in an effort to eliminate or reduce lengthy network transactions. Before describing operation of the content manager 128 in detail, however, operation of the abstract query interface 146 will be described with reference to FIGS. 2A and 2B.

An Exemplary Runtime Environment

Figure 2A:
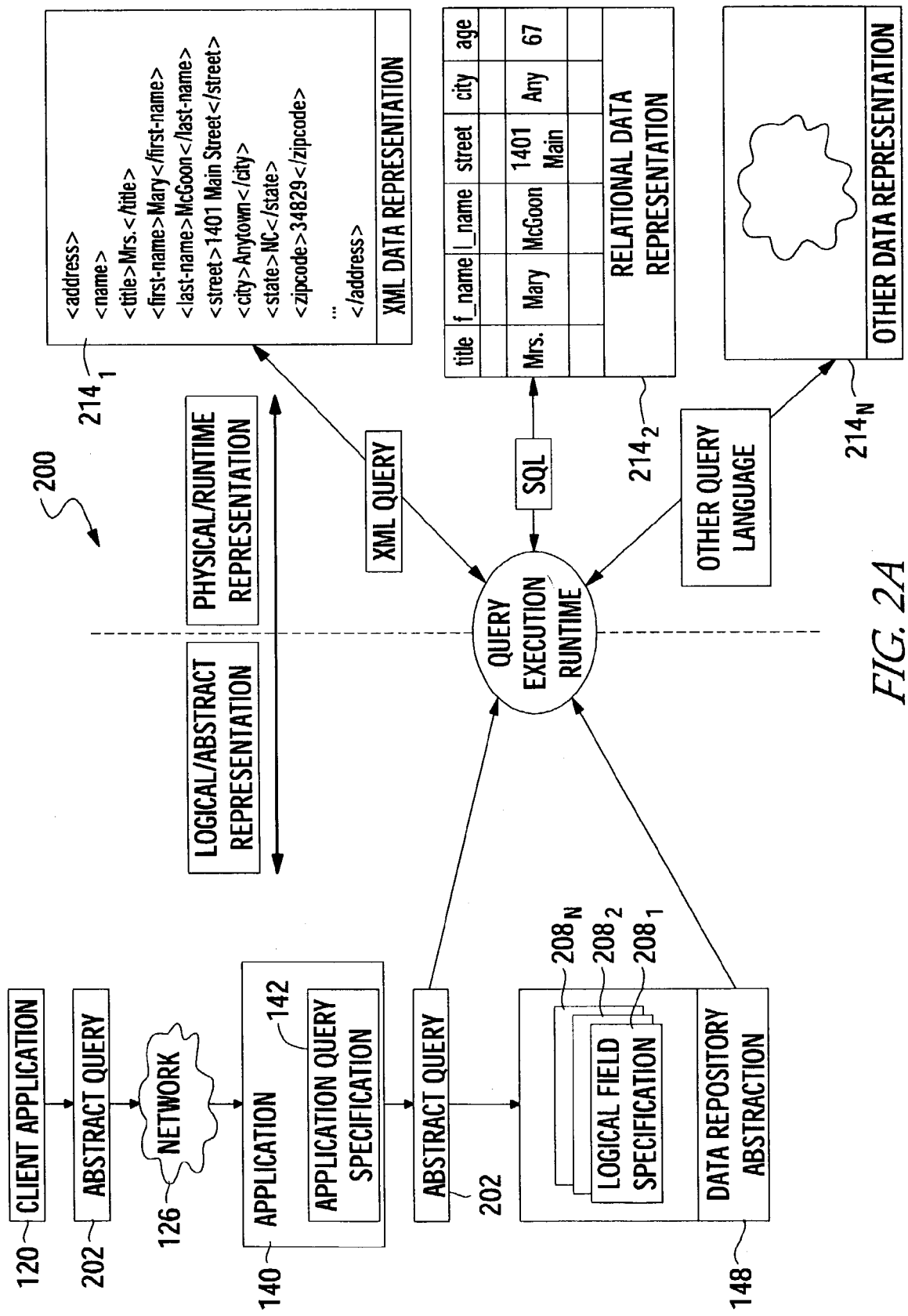
FIG. 2 is a relational view of software components of one embodiment of the present invention.

FIG. 2A illustrates a relational view of the client application 120, server application 140, DRA component 148, and query execution component 150, according to one embodiment of the invention. As illustrated, the DRA component 148 includes a set of logical field specifications 208 that may provide abstract representations of corresponding fields in a physical data representation, for example, of data in the one or more databases 156 shown in FIG. 1. The physical data representation may be an XML data representation $214_1$, a relational data representation $214_2$, or any other data representation, as illustrated by $214_N$. Regardless of the actual physical data representation, a user may generate, via the query building interface 122 of the client application 120, an abstract query 202 including query conditions based on the logical fields defined by the logical field specifications 208, in order to access data stored therein.

Figure 2B:
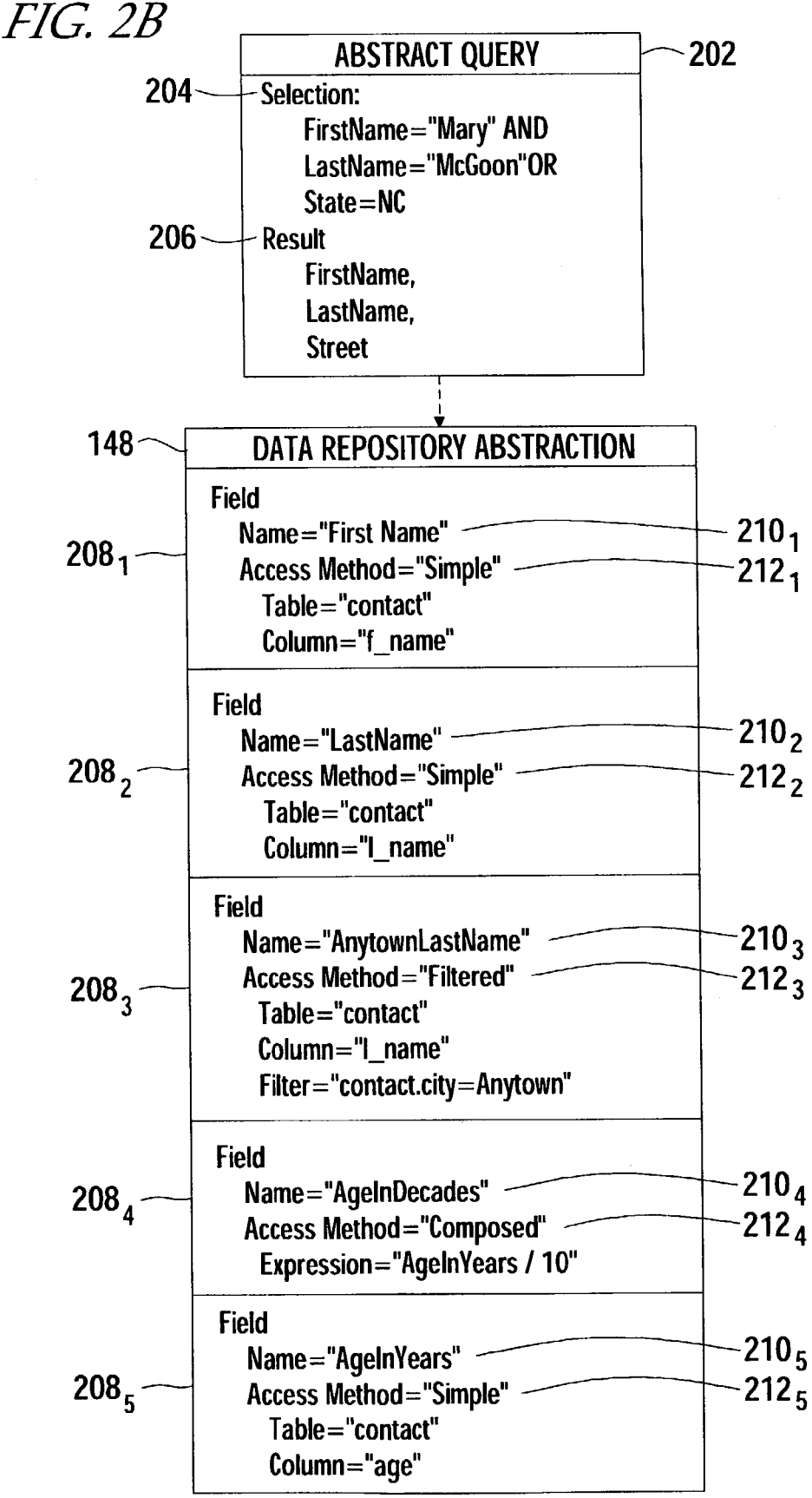

The query execution component 150 is generally configured to execute the abstract query 202 by transforming the abstract query 202 into a concrete query compatible with the physical data representation (e.g., an XML query, SQL query, etc). The query execution component 150 may transform the abstract query 202 into the concrete query by mapping the logical fields of the abstract query 202 to the corresponding physical fields of the physical data representation 214, based on mapping information in the DRA component 148. For example, as illustrated in FIG. 2B, the DRA component 148 may include, for each logical field specification 208, field names 210, table names, and access methods 212 describing how to access and/or manipulate data from the corresponding physical field in the physical data representation 214. The mapping of abstract queries to concrete queries, by the query execution component 150, is described in detail in the previously referenced co-pending application 10/083,075.

An illustrative DRA representation corresponding to a portion of the DRA component 148 (as shown, logical field specifications $208_1$ and $208_2$) shown in FIG. 2B is listed in Table II below. By way of illustration, the DRA representation shown below is defined using XML. However, any other language may be used to advantage.

TABLE II

DATA REPOSITORY ABSTRACTION EXAMPLE

```
001  <?xml version="1.0"?>
002  <DataRepository>
003    <Category name="Demographic">
004      <Subcategory name="Name">
005        <Field queryable="Yes"
               name="FirstName" displayable="Yes">
006          <AccessMethod>
007            <Simple columnName="f_name"
                  tableName="contact"></Simple>
008          </AccessMethod>
009          <Type baseType="char"></Type>
010        </Field>
011        <Field queryable="Yes"
               name="LastName" displayable="Yes">
012          <AccessMethod>
013            <Simple columnName="l_name"
                  tableName="contact"></Simple>
014          </AccessMethod>
015          <Type baseType="char"></Type>
016        </Field>
```

TABLE II-continued

DATA REPOSITORY ABSTRACTION EXAMPLE

```
017      </Subcategory>
018    </Category>
019  </DataRepository>
```

The listing above illustrates how, for some embodiments, the DRA component 148 may be implemented as a hierarchical data structure of nodes, in this case including categories, subcategories, and fields. As will be described below, this hierarchical structure may be exploited to seemingly present to the user the entire DRA component 148 while actually loading only limited portions of the DRA component 148 at any given time.

Partial Data Model Exposure

As previously described, logical fields of the DRA component 148 may be loaded on the client 102 and exposed to the user via the query interface 122 for query building purposes. For example, the illustrated information listed (in TABLE II above) for each of the fields (e.g., whether a field is queryable and/or displayable) may be used by the query interface 122 to determine how a field may be used in a query. However, because the amount of available system memory may be insufficient to feasibly hold the entire DRA component 148 (particularly in the case of handheld devices, such as the PDA $102_3$ shown in FIG. 1), only portions of the DRA component 148 may be loaded (e.g., cached) on the client at any given time.

For some embodiments, the portions loaded on the client may be determined by user input, such as navigation requests, as the user is working with the query building interface 122. In other words, as a user navigates the hierarchical structure of the DRA component 148, portions may be retrieved, only as needed (or as their need is anticipated). As previously described the portions (or content) of the DRA component 148 that is resident on the client at any given time may be managed by a software component referred to as a content manager 128.

Figure 3:
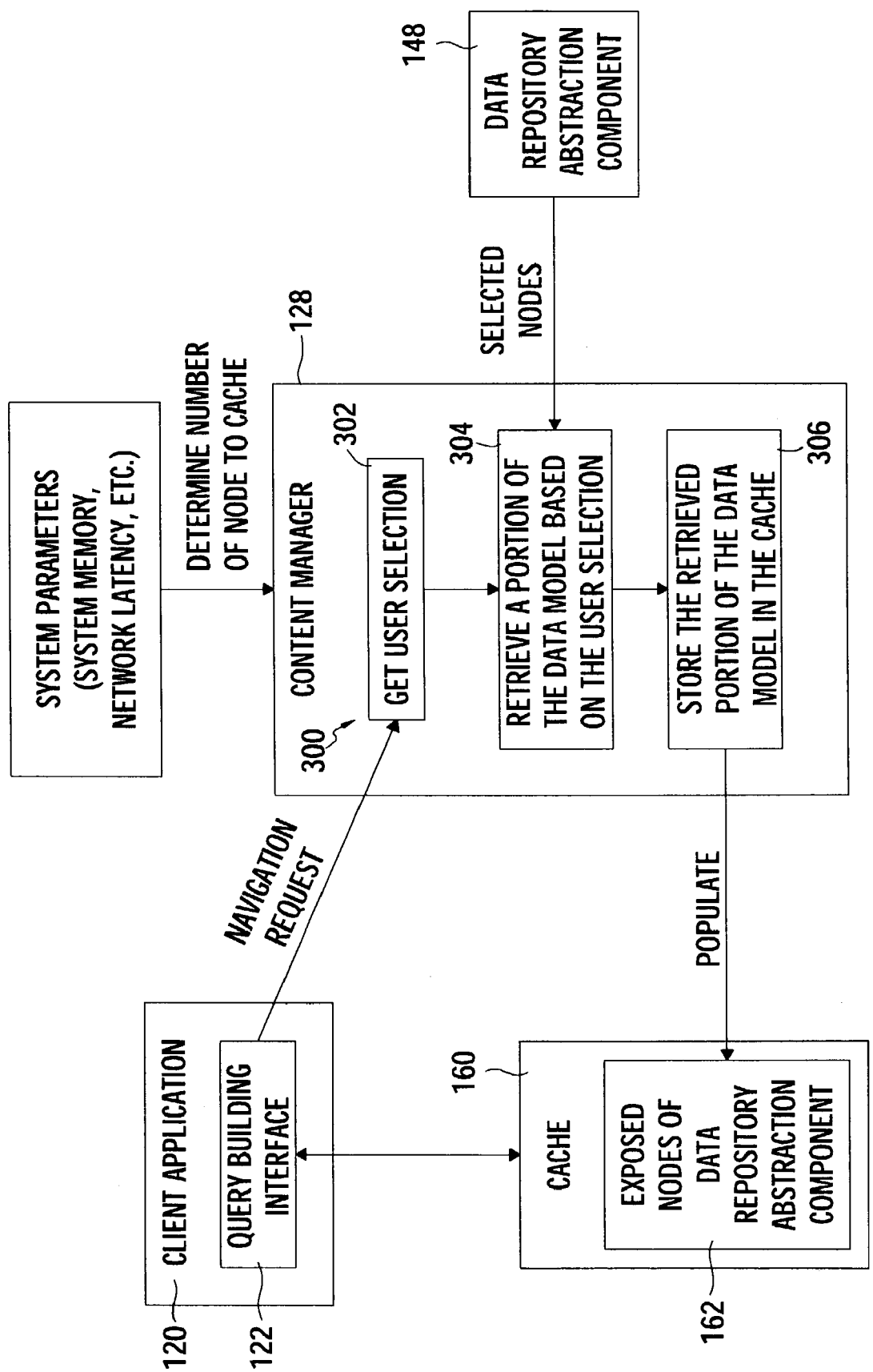
FIG. 3 is another relational view of software components of one embodiment of the present invention.

FIG. 3 illustrates a relational view of the content manager 128 to the query building interface 122, according to one embodiment of the present invention. As illustrated, the content manager 128 may be generally configured to retrieve selected nodes 162 from the DRA component 148, based on navigation requests from a user, and expose the selected nodes 162 in a client side cache 160. In other words, the cache 160 contains the portion of the DRA component 148 (e.g., XML descriptions of logical fields and/or categories of fields) that is exposed to the user via the query building interface 122.

As a user is navigating through the categories and fields of the DRA component 148 via the user interface 122, the content manager 128 may be configured to perform exemplary operations 300, for example, to continuously update the selected nodes 162, in an effort to facilitate the navigation. The operations 300 may best be described with reference to FIGS. 4A-4D, which illustrate exemplary GUI screens, that may be provided as part of the query interface 122.

The operations 300 begin at step 302, when the content manager 128 receives a user selection, such as a request to view a different set of fields or a different set of categories. For example, the user may be presented with a query building GUI screen 500, such as that shown in FIG. 4A. The GUI screen 500 may allow the user to build a query by adding conditions (via a button 504) and results (via a button 512). Added conditions may be listed in a Conditions Window 502, while added results (none shown) may be listed in a Results Window 510.

FIG. 4B shows an exemplary GUI screen 530 that may be generated in response to the user selecting (clicking) the ADD CONDITON button 504. As illustrated, the GUI screen 530 may show a list of high level categories, such as DIAGNOSTIC and DEMOGRAPHIC categories. Each of the categories may represent a node in the DRA component 148. As shown, a user may "drill down" into one of the categories by selecting it and clicking a NEXT button 540. In other words, the selection of a category may represent the type of user navigation request detected by the content manager 128, at step 302.

At step 304, the content manager 128 retrieves a portion of the data model (implemented as the DRA component 148) based on the user selection. At step 306, the content manager 128 stores the retrieved portion of the data model in the cache 160. Detailed operations for retrieving and storing portions of the data model in the cache 160 are described in greater detail below with reference to FIGS. 6A and 6B. As a general example, in response to the user selecting a category, the content manager 128 may retrieve, from the DRA component 148, the fields or subcategories corresponding to the selected category and place the retrieved fields or subcategories in the cache 160 for access by the query interface 122. As a specific example, if the user selected the DEMOGRAPHIC category from FIG. 4B, the content manager 128 may retrieve nodes corresponding to the subcategories shown in the GUI screen 540 of FIG. 4C.

In a similar manner, if the user selected one of the subcategories shown in FIG. 4C, such as the BIRTH AND AGE RELATED subcategory, the content manager 128 may retrieve nodes corresponding to the fields of the subcategory, as shown in the GUI screen 550 of FIG. 4D. As previously described, fields generally correspond to leaf nodes (nodes with no children). From the GUI screen 550, the user may generate conditions based on the fields, for example, by specifying logical operators (e.g.,">", "<", or "=") and specifying values. As shown, the conditions may be added to the query by clicking a button 544 which may, for example, return the user to the GUI screen 500 of FIG. 4A, listing the newly added condition in the Conditions window 502. The content manager 128 may operate in a similar manner as results fields are added to the query.

Cache Management

In general, the content manager 128 may be configured to intelligently cache portions of the DRA component 148, in an effort to allow the user to navigate through the nodes (e.g., categories and fields), as if the complete structure was stored on the client. As indicated in FIG. 3, the content manager 128 may determine the extent of the DRA component 148 that can be resident in the cache 160 based on one or more system parameters, such as available system memory and network latency. In other words, these system parameters may indicate how many nodes will fit in the cache 160 at any given time, as well as how long it may take to retrieve nodes from the DRA component 148 (residing on the server 104) via the network 126.

Figure 5A:
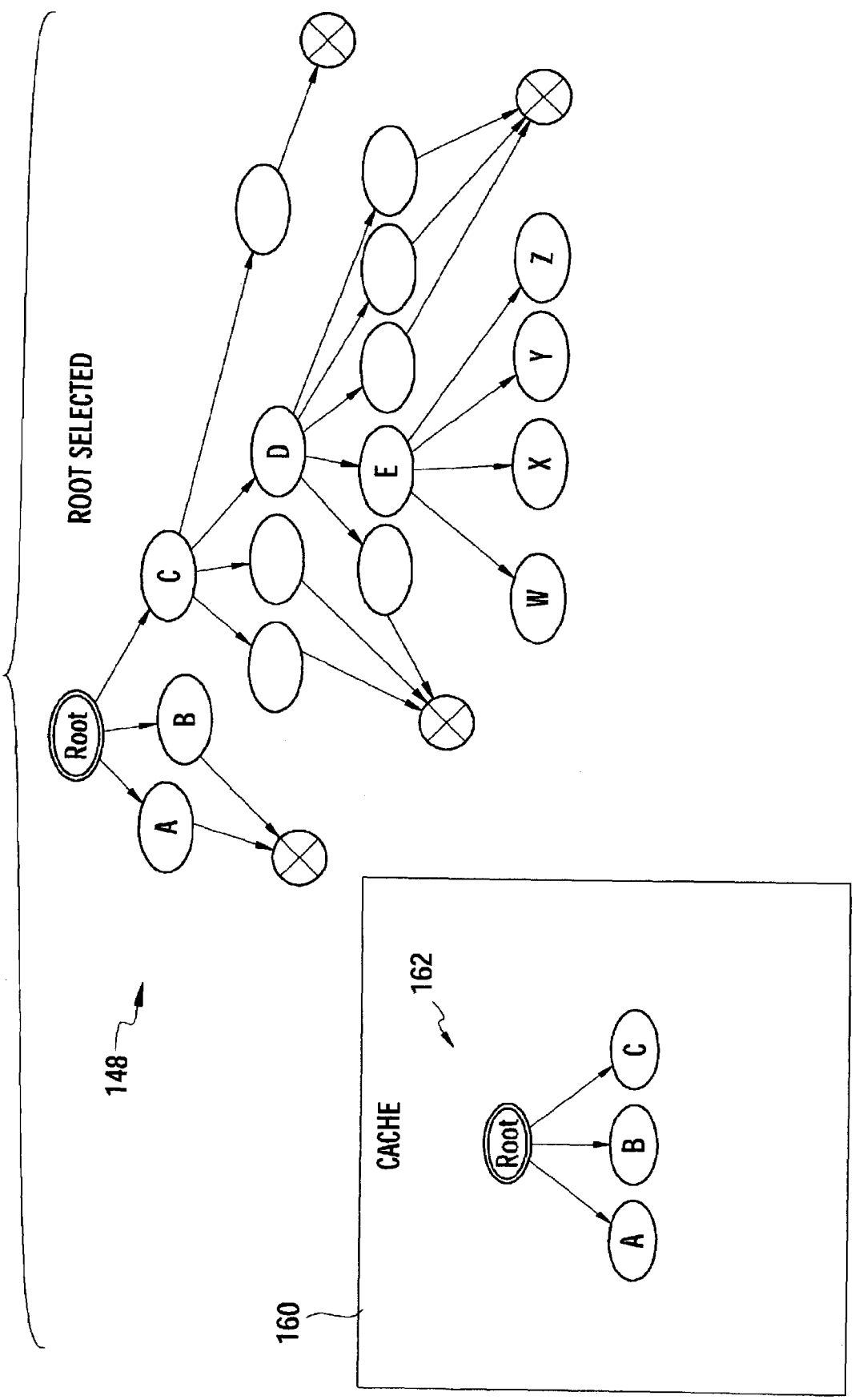

FIGS. 5A-5D illustrate the concept of selectively maintaining portions 162 of a DRA component 148 implemented as a hierarchical node or "tree" structure (of categories, subcategories, and fields) in the cache 160, as a user navigates the tree. The nodes with "Xs" in FIG. 5A represent subtrees of arbitrary complexity. However, for illustrative purposes, in the example illustrated in FIGS. 5A-5D, a user will traverse the tree structure taking a path (from the Root node) through nodes C, D, and E. Therefore, the subtrees will not be discussed. Further, for illustrative purposes, it will be assumed that a total of only 13 nodes will fit in the cache at any given time. Of course, it will be appreciated that the number of nodes that will actually fit may depend on the size of the cache and the size of the nodes (e.g., the size of the XML representation of the nodes).

Figure 5B:
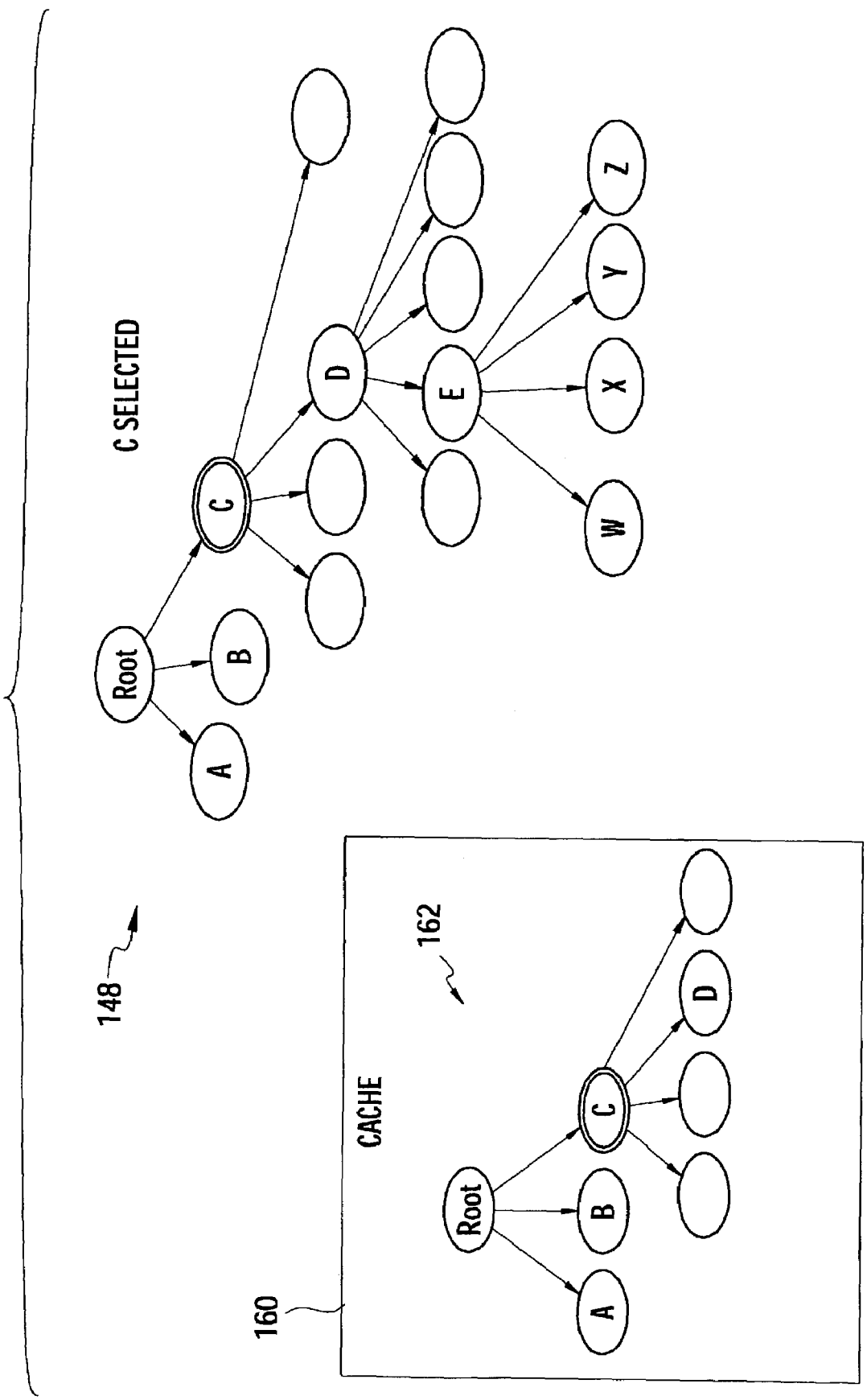
Figure 5C:
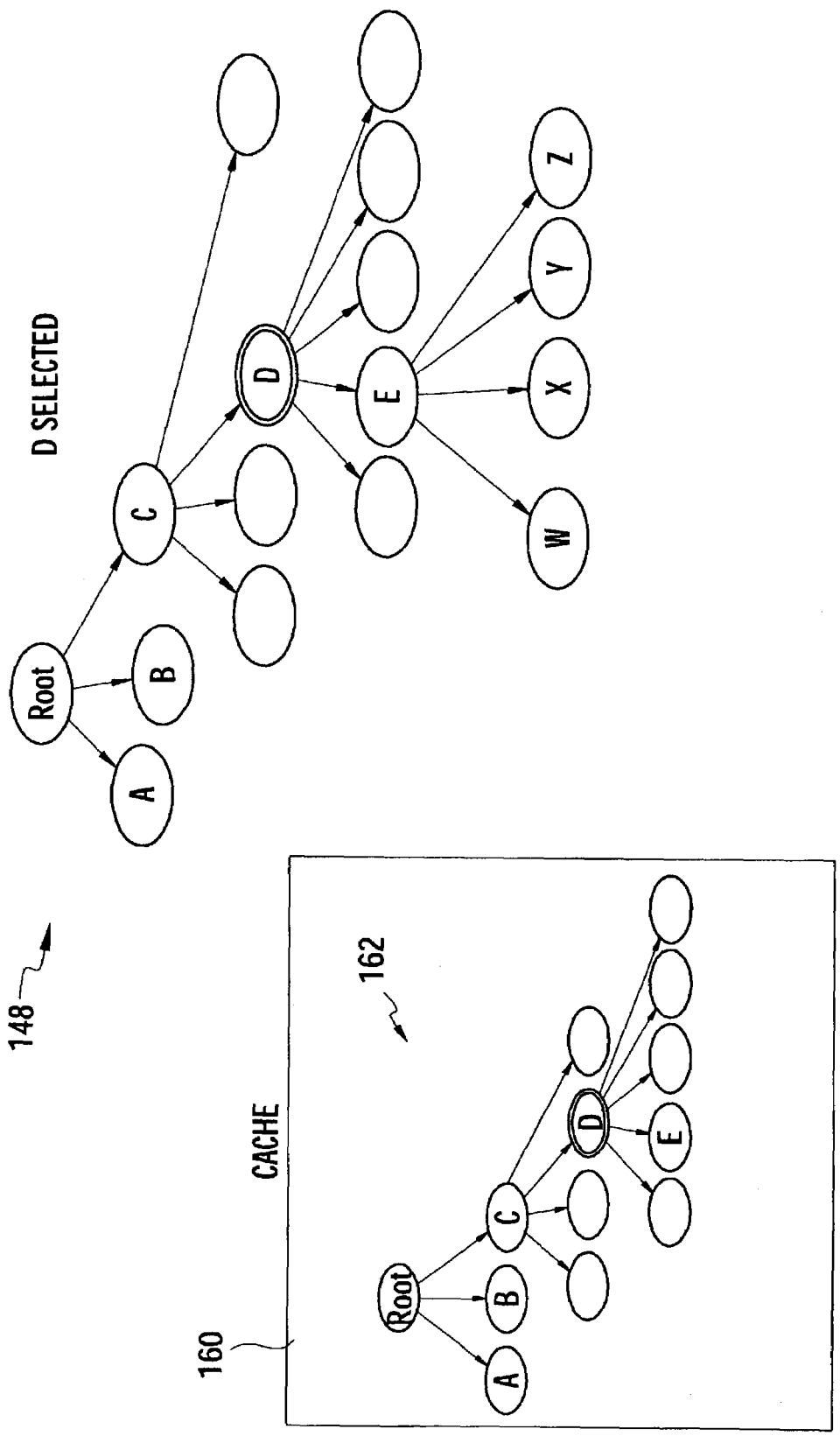
Figure 6A:
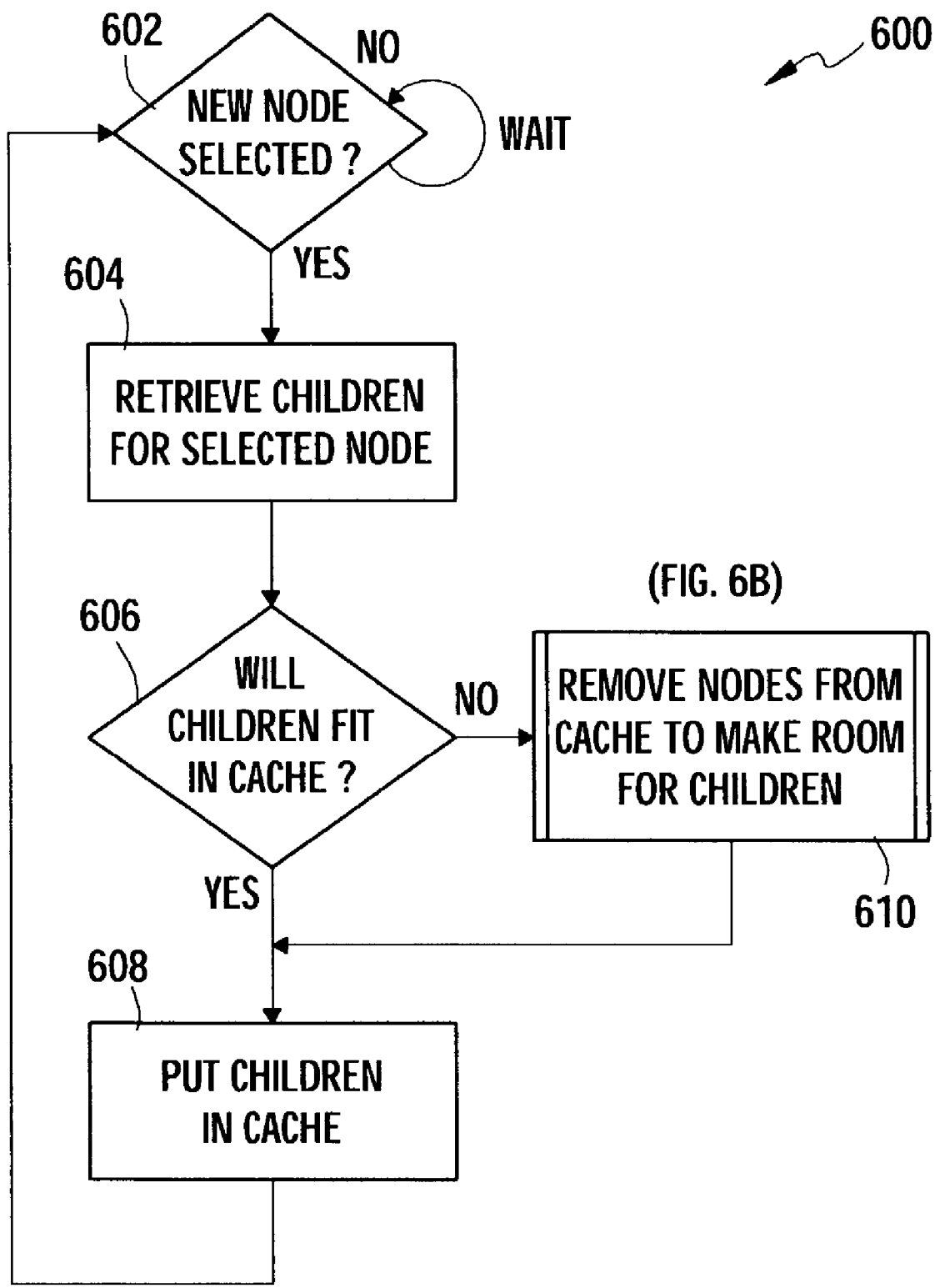
FIGS. 6A and 6B illustrate exemplary operations for adding nodes to a client cache and removing nodes form a client cache, respectively, in accordance with the present invention.

FIG. 6A illustrates exemplary operations 600 that may be performed by the content manager 128 in maintaining the cache 160 and may, therefore, be described concurrently with the FIGS. 5A-5D. The operations begin at step 602, by waiting for the user to select a new node. As illustrated in FIG. 5A, for example, in response to invoking the query interface 122, the root node and its immediate children (nodes A, B, and C) may be placed in the cache. As an example, the nodes A, B, and C, may represent the DIAGNOSTIC, TEST RESULTS, and DEMOGRAPHIC categories shown in the GUI screen 530 of FIG. 4B.

At step 604, once a new node is selected, the children for the selected node are retrieved. At step 606, a determination is made as to whether the retrieved children nodes will fit in the cache 160 (i.e., if there is sufficient available space in the cache 160 to store the retrieved nodes). If there is sufficient available space, the children nodes are placed in the cache, at step 608.

For example, referring to FIG. 5B, if node C is selected, the children for node C (as illustrated, the row of nodes containing node D) are retrieved. As there are only 4 nodes in the cache 160, and the cache 160 will hold 13 nodes, the children are added to the cache 160, and processing returns to step 602, for example, to wait for the next node selection.

Referring now to FIG. 5C, the user may select node D. Therefore, the children of node D (as illustrated, the row of children containing node E) are retrieved. As there are only 8 nodes in the cache 160, there is still room in the cache 160, and the children are added to the cache 160. At this point, since the example assumes the cache 160 can only hold 13 nodes, the cache 160 is full.

Therefore, referring now to FIG. 5D, when the user selects node E, the children of node E (leaf nodes W-Z) will not fit in the cache 160. Accordingly, at step 610, nodes must be removed from cache 160 to make room for the children of node E. As illustrated, removing the siblings of node E provides sufficient space, such that the children of node E may be added to the cache 160.

As previously described, retrieving nodes from the DRA component 148 residing on the server requires a network transaction and the client may have a limited bandwidth network connection. Therefore, for some embodiments, nodes may be retrieved in an effort to minimize the effects of network latency. For example, rather than retrieve only the children of a selected node, the content manager may anticipate future node selections and "pre-fetch" additional nodes (e.g., larger portions of a branch originating from a selected node possibly including grandchildren). This pre-fetching may occur in the background, for example, after the children nodes of the selected node have been presented (displayed) to the user by the query interface 122.

In other words, the children of the node selected by the user may already be resident in the cache 160, and may therefore, be promptly displayed to the user as the content manager 128 pre-fetches additional nodes (e.g., subordinate to the displayed children), in an effort to stay one step ahead of the user and provide the query interface 122 with a "look and feel" as if the entire DRA component 148 is resident on the client. As a user makes selections, pre-fetched nodes not in a selected path may be removed to make room for other nodes to be pre-fetched. For some embodiments, the algorithm utilized to remove nodes from the cache 160 may also be chosen in an effort to minimize the number of times nodes must be retrieved from the DRA component 148. For example, the algorithm may chosen according to a prediction of which nodes presently in the cache a user is likely to select in the future.

Removing Nodes from the Cache

Figure 6B:
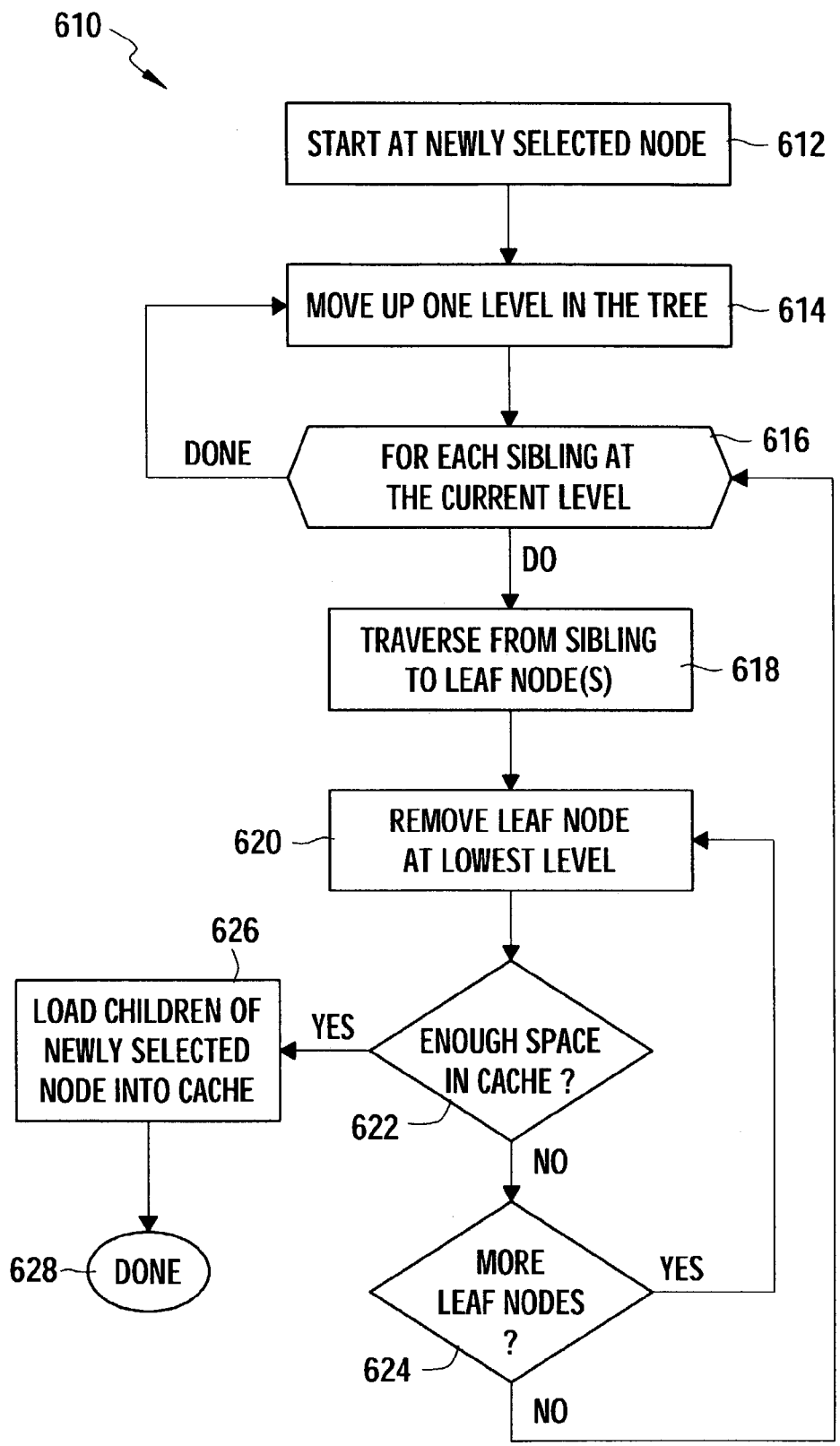
Figure 7B:
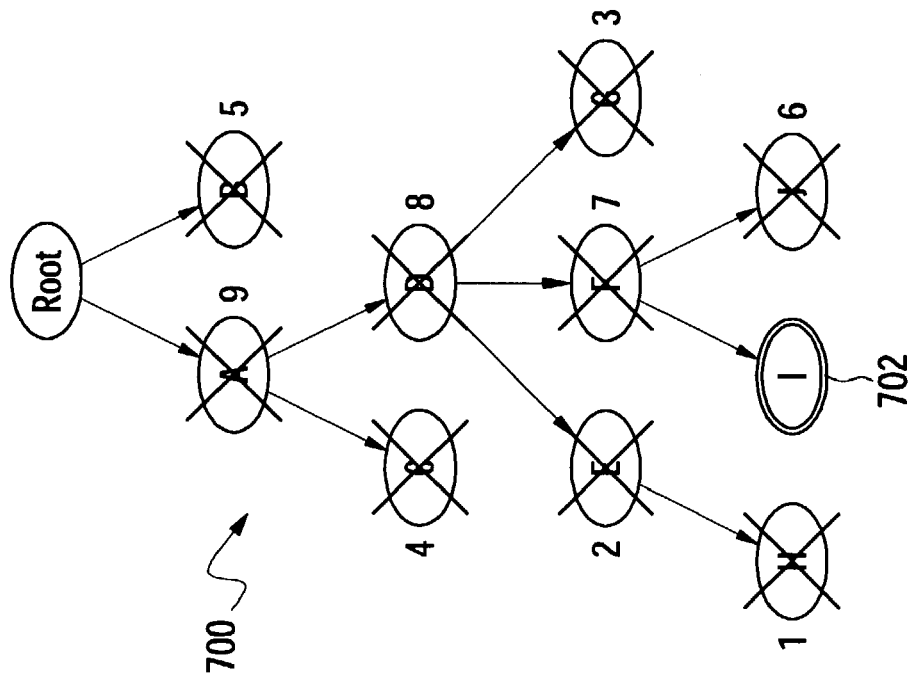
FIGS. 7A and 7B illustrate another exemplary tree structure of a data model before and after, respectively, removing nodes therefrom in accordance with the present invention.
Figure 7A:
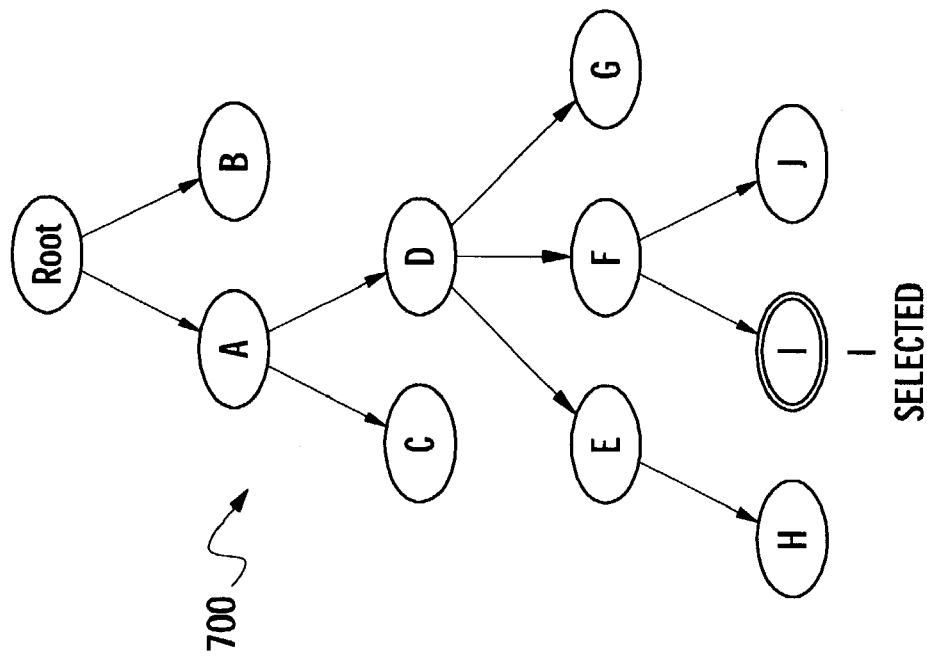

FIG. 6B illustrates exemplary operations of an algorithm that may be performed by the content manager 128 for removing nodes from the cache, for example, as part of the operation of step 610 of FIG. 6A. The operations of FIG. 6B may best be explained with reference to FIGS. 7A and 7B, which illustrate an exemplary tree structure 700 before and after removing or "pruning" nodes, respectively. The operations comprise iteratively traversing branches of the tree 700 and removing nodes at each iteration. The numbers by each removed node (indicated by an "X") indicate the order in which the node was removed. It should be noted that while not shown, it is assumed that the selected node I of the tree 700 has children that the content manager 128 is to load into the cache 160.

It should also be noted that, in the illustrated example, preference is given to nodes in a direct (ancestral) path from the root node to the selected node. In other words, nodes in the direct path are not removed until all other nodes have been removed. This approach may be taken in an effort to maintain, in the cache, nodes that a user is likely to select. As an example, node F may represent a category having two related subcategories (nodes I and J). A user building a query involving fields in the subcategory (I), may also be likely to involve fields from the related subcategory J. Therefore, maintaining both nodes I and J in the cache 160 may reduce an additional retrieval, across the network, of the node J and any children nodes thereof.

The operations begin at step 612, by locating the newly selected node (as illustrated, node I), to use as a starting point. At step 614, the content manager 128 moves up one level in the tree (to node F). At step 616, a loop of operations (618-624) are performed for each sibling of the current node (F), but not for node F itself, as it is in the direct ancestral path from selected node I.

At step 618, the content manager 128 traverses (down) the branch of the tree beginning at the current sibling node to leaf nodes (if any). At step 620, the lowest level leaf node is removed. For example, assuming the content manager selects siblings from left to right, sibling node E will be selected first, at step 616. Therefore, at step 618, the content manager will traverse the branch from node E down to node H and remove node H first, at step 620.

At step 622, the content manager performs a test to determine if, after removing the node at step 620, there is now sufficient space in the cache 160 for the children of the selected node (I). If there is sufficient space, the children of selected node I are loaded into the cache 160, at step 626, and the operations are exited, at step 628.

On the other hand, if there is not sufficient space in the cache 160, the content manager 128 determines, at step 624, if there are any more leaf nodes for the branch beginning with the current sibling. If there are more leaf nodes, processing returns to step 620, to remove the leaf nodes. For example, as illustrated, after removing the node H, the sibling node E now becomes a leaf node. Therefore, the node E may be removed next. Assuming there is still not enough space in the cache 160, processing may then proceed to step 616, to select the next sibling (G) at the current level. As illustrated, G is a leaf node and is, therefore, removed next.

If there is still not enough room in the cache 160, having performed the loop of operations for (and removing) each sibling of the current level (F), the content manager 128 proceeds to step 614, to again move up a level (to node D). For this iteration, performing the operations of steps 616-624 results in the removal of node C. If there is still not enough room in the cache 160, the content manager 128 moves up a level (to node A) and removes node B.

At this point, the root node is reached. As described above, in the illustrated example, preference has been given to nodes in the direct ancestral path from the selected node I. However, once the root node is reached, the only nodes remaining are in the direct ancestral path (nodes A, D, F and the child J of node F). Therefore, if there is still not sufficient space in the cache 160, these remaining nodes may now be removed. For example, the operations of FIG. 6A may be repeated again, this time without giving preference to nodes in the direct ancestral path. Therefore, at step 614, the content manager 128 may move up one level from the selected node I, to node F. At this point there are no sibling nodes in the direct path. Therefore, at step 618, the content manager 128 traverses to the leaf node J, which is removed at step 620. The removal of node J makes node F a leaf node, so it is removed next, if necessary to make room in the cache 160, followed by the removal of nodes B and A, in that order.

Of course, the exemplary operations of FIG. 6B are illustrative of just one algorithm that may be utilized by the content manager 128 to remove nodes from the cache 160 and any suitable algorithm may be utilized to achieve a desired result. The operations may also be modified to handle nodes having a large number of children nodes (e.g., 500 children under a node may not fit in the cache 160). In this case, the content manager may be configured to load a subset of children, and monitor which children within a list of children are currently in the cache (e.g., children 10-20 of node X). Therefore, the number of a child may become another criteria in removal (e.g., in addition to level in the tree). For example, the content manager 128 may be generally configured to keep the lowest numbered children when a subset of a row of children has to be removed.

CONCLUSION

Client-side caching of portions of a large data abstraction model may allow a client having limited resources, such as a handheld device, to effectively present a relatively large data model to a user. By selectively choosing, based on user input, the portions of the data model to load in the cache, a query interface may allow the user to seamlessly navigate the data model as if it were resident on the client.

While the foregoing is directed to embodiments of the present invention, other and further embodiments of the invention may be devised without departing from the basic scope thereof, and the scope thereof is determined by the claims that follow.

What is claimed is:

1. A computer-implemented method for using a system that includes a client device and a server device described by a plurality of system parameters in building queries against a database represented by a data abstraction model, the method comprising:

receiving, from a user interacting with the client device, a first request to display one or more logical fields of the data abstraction model, wherein the data abstraction model includes a plurality of logical field fields representative of physical fields of the database, wherein each logical field includes a logical field definition specifying at least a name and an access method for accessing physical data elements stored in physical fields of the database corresponding to a respective logical field, and wherein each logical field provides a query element available for inclusion in an abstract query;

selectively retrieving, in response to the request, a portion of the data abstraction model that includes the one or more logical fields, based on system parameters that limit accessibility to the data abstraction model by the client device;

storing the retrieved portion of the data abstraction model in a cache available on the client device;

displaying the one or more logical fields to the user;

receiving, from the user, a second request to display one or more logical fields of the data abstraction model;

determining if there is sufficient available space in the cache to store the one or more logical fields specified by the second request;

in response to determining there is insufficient available space in the cache to store the one or more logical fields specified by the second request, selectively removing portions of the data abstraction model from the cache to make sufficient available space for the retrieved portion of the data abstraction model; and displaying the one or more logical fields specified by the second request.

2. The method of claim 1, wherein the retrieved portion of the data abstraction model comprises at least one of the one or more logical fields the user requested to display.

3. The method of claim 1, wherein the one or more logical fields are displayed to the user prior to retrieving the portion of the data abstraction model.

4. The method of claim 1, wherein:
at least some of the logical fields are organized as categories; and
receiving the request from the user comprises receiving a request to display one or more logical fields in a common category.

5. The method of claim 4, wherein the retrieved portion of the data abstraction model comprises some, but not all, logical fields in the common category.

6. A method for accessing a hierarchical tree structure of nodes, the method comprising:
receiving a first request from a user to access a first node, of the hierarchical tree structure of nodes, wherein each node identifies a respective plurality of logical field fields representative of physical fields of a database, wherein each logical field includes a logical field definition specifying at least a name and an access method for accessing physical data elements stored in physical fields of the database corresponding to a respective logical field, and wherein each logical field provides a query element available for inclusion in an abstract query;

in response to the request, selectively retrieving a portion of the plurality of logical fields identified by at least the first node based on a storage capacity of a cache available on a client device;

storing the retrieved portion of logical fields in the cache; and presenting, to the user, the one or more links to other nodes of the hierarchical tree structure of nodes, associated with the first node;

receiving a second request to access one of the nodes linked to by the first node;

determining if there is sufficient available space in the cache to store the logical fields identified by the node specified by the second request;

if not, selectively removing one or more of the logical fields stored in the cache to free available space sufficient to store the logical fields of the node specified by the second request; and presenting, to the user, the one or more logical fields specified by the second request.

7. The method of claim 6, wherein the retrieved portion of the plurality of logical fields identified by at least the first node includes logical fields retrieved from one or more nodes subordinate to the first node.

8. The method of claim 7, wherein the retrieved portion of the plurality of logical fields identified by at least the first node includes logical fields retrieved from one or more nodes subordinate to children of the first node.

9. The method of claim 6, wherein the hierarchical tree structure of nodes is contained in an XML document.

10. The method of claim 6, wherein each node represents a field or category of fields in a database.

11. The method of claim 6, wherein selectively removing one or more portions of the tree structure comprises maintaining logical fields from nodes in the cache that form a path from a root node to the first node.

12. The method of claim 6, wherein selectively removing one or more portions of the tree structure comprises traversing the tree structure in an ordered manner and removing logical fields associated with one or more leaf nodes of the tree structure.

13. The method of claim 12, wherein traversing the tree structure in an ordered manner comprises iteratively:
moving up a level from the first node to select a node in a direct ancestral path between a root node and the first node; and
removing at least one of a sibling node of the selected node or a subordinate node to a sibling node of the selected node.

* * * * *